(12) United States Patent
Wang et al.

(10) Patent No.: US 12,118,105 B2
(45) Date of Patent: Oct. 15, 2024

(54) METHOD, ELECTRONIC DEVICE, AND COMPUTER PROGRAM PRODUCT FOR PROCESSING ACCESS PERMISSION

(71) Applicant: Dell Products L.P., Round Rock, TX (US)

(72) Inventors: Robin Wang, Chengdu (CN); Ellie Jiang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 335 days.

(21) Appl. No.: 17/699,011

(22) Filed: Mar. 18, 2022

(65) Prior Publication Data

US 2023/0237175 A1   Jul. 27, 2023

(30) Foreign Application Priority Data

Jan. 21, 2022  (CN) .......................... 202210070974.1

(51) Int. Cl.
*G06F 15/16* (2006.01)
*G06F 21/60* (2013.01)
*G06F 21/62* (2013.01)

(52) U.S. Cl.
CPC ........ *G06F 21/6209* (2013.01); *G06F 21/604* (2013.01); *G06F 21/6218* (2013.01); *G06F 2221/2141* (2013.01)

(58) Field of Classification Search
CPC ............... G06F 21/6209; G06F 21/604; G06F 21/6218; G06F 2221/2141
See application file for complete search history.

(56) References Cited

U.S. PATENT DOCUMENTS

| | | | | |
|---|---|---|---|---|
| 5,889,952 A | * | 3/1999 | Hunnicutt | G06F 21/6218 |
| | | | | 709/219 |
| 7,185,192 B1 | * | 2/2007 | Kahn | G06F 21/6218 |
| | | | | 707/999.102 |
| 7,552,122 B1 | * | 6/2009 | Georgiev | G06F 11/203 |
| | | | | 707/999.009 |
| 10,990,693 B1 | * | 4/2021 | Newman | G06F 21/602 |
| 2010/0049718 A1 | * | 2/2010 | Aronovich | G06F 12/0802 |
| | | | | 707/607 |

(Continued)

FOREIGN PATENT DOCUMENTS

| | | | | |
|---|---|---|---|---|
| CN | 110460581 A | * | 11/2019 | ......... H04L 63/0428 |
| KR | 2021041719 A | * | 4/2021 | ........... G06F 16/182 |

*Primary Examiner* — Richard G Keehn
(74) *Attorney, Agent, or Firm* — Amin, Turocy & Watson, LLP

(57) ABSTRACT

Access permission is enabled. For example, in response to receiving an access request for a target file from a first client, a type of an access permission contained in the request is determined. Then, a first type of access permission is determined that can be assigned to the first client if it is determined that the contained type is in a set of reference types. Further, it may be determined that a second type of access permission applicable to be assigned to the target file. It can then be determined, from the first type and the second type, a target type of an access permission to be assigned to the first client. As a result, the probability of assigned access permissions being interrupted can be reduced, the performance of a client and a server is increased, efficiency is increased, and the user experience is improved.

20 Claims, 7 Drawing Sheets

(56) References Cited

U.S. PATENT DOCUMENTS

| | | | | |
|---|---|---|---|---|
| 2012/0124183 | A1* | 5/2012 | Long | G06F 3/0659 |
| | | | | 709/219 |
| 2015/0312872 | A1* | 10/2015 | Liang | H04W 60/00 |
| | | | | 455/435.1 |
| 2020/0026783 | A1* | 1/2020 | Watanabe | G06F 16/176 |
| 2020/0204511 | A1* | 6/2020 | Choi | H04L 51/216 |
| 2020/0226285 | A1* | 7/2020 | Bulleit | G06F 21/33 |
| 2020/0320203 | A1* | 10/2020 | Ting | G06F 21/577 |
| 2020/0356534 | A1* | 11/2020 | R. | G06F 9/526 |
| 2021/0319895 | A1* | 10/2021 | Joao | G06F 16/182 |
| 2023/0274014 | A1* | 8/2023 | Hirota | G06F 21/604 |
| | | | | 713/193 |

* cited by examiner

METHOD, ELECTRONIC DEVICE, AND COMPUTER PROGRAM PRODUCT FOR PROCESSING ACCESS PERMISSION

RELATED APPLICATION

The present application claims the benefit of priority to Chinese Patent Application No. 202210070974.1, filed on Jan. 21, 2022, which priority application is hereby incorporated into the present application by reference herein in its entirety.

TECHNICAL FIELD

Embodiments of the present disclosure relate to the field of data processing, and in particular, to a method, an electronic device, and a computer program product for processing an access permission.

BACKGROUND

With the continuous development of network communication technologies and network resource sharing mechanisms, research on protocols and mechanisms supporting data sharing between networks has attracted broad attention from researchers. A Server Message Block (SMB) protocol, serving as a local area network file sharing transmission protocol, is often used as a platform for research on shared file security transmission.

The SMB protocol is a client/server request/response protocol. Through the SMB protocol, client applications may read and write files on servers and make service requests to server programs in various network environments. However, there are still many problems to be solved in the process of using the SMB protocol.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The embodiments of the present disclosure provide a method, an electronic device, and a computer program product for processing an access permission.

According to a first aspect of the present disclosure, a method for processing an access permission is provided. The method includes determining, in response to receiving an access request for a target file from a first client, a type of an access permission contained in the request. The method also includes determining a first type of an access permission which can be assigned to the first client if it is determined that the contained type is in a set of reference types. The method also includes determining a second type of an access permission applicable to be assigned to the target file. The method also includes determining from the first type and the second type a target type of an access permission to be assigned to the first client.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: determining, in response to receiving an access request for a target file from a first client, a type of an access permission contained in the request; determining a first type of an access permission which can be assigned to the first client if determining that the contained type is in a set of reference types; determining a second type of an access permission applicable to be assigned to the target file; and determining from the first type and the second type a target type of an access permission to be assigned to the first client.

According to a third aspect of the present disclosure, a computer program product is provided, which is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

Identical or corresponding numerals represent identical or corresponding parts in the accompanying drawings.

DETAILED DESCRIPTION

Figure 1:
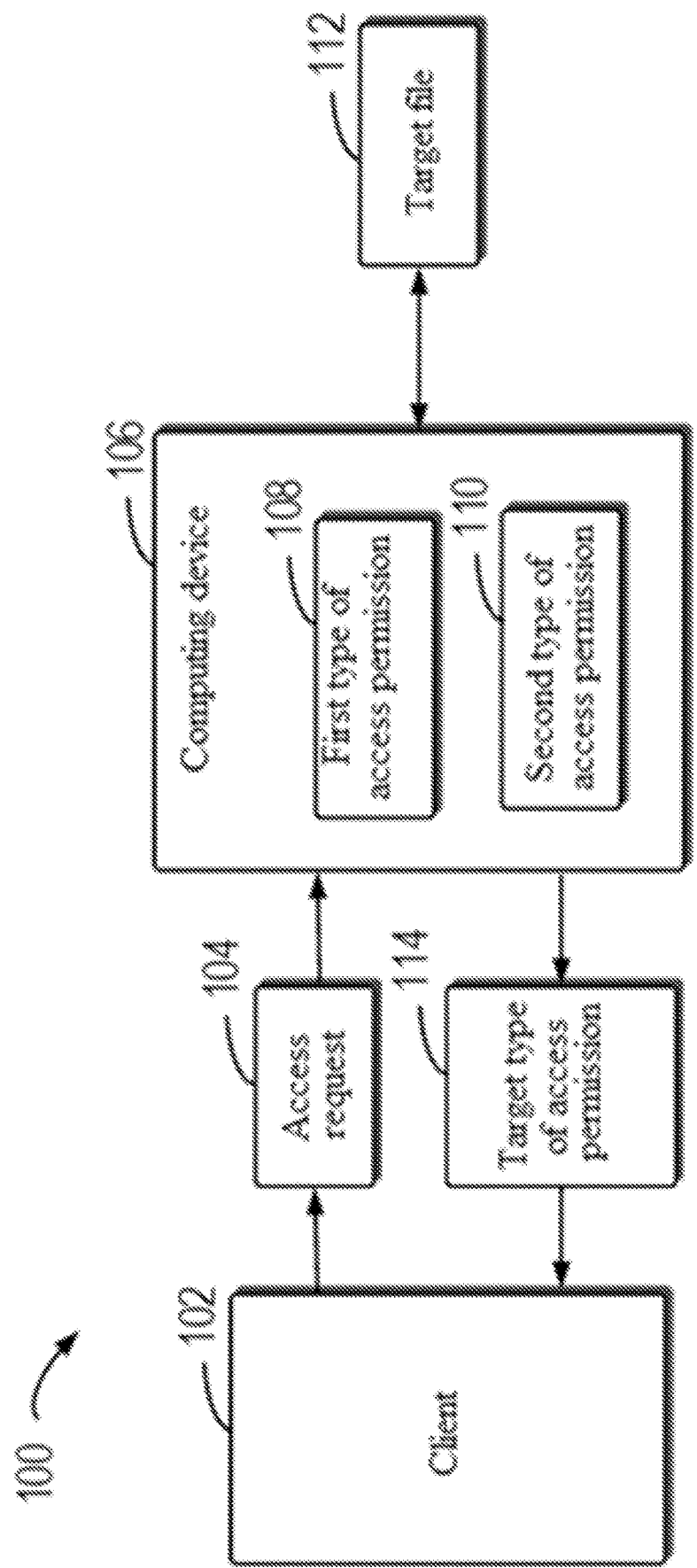
FIG. 1 illustrates a schematic diagram of example environment 100 in which a device and/or a method according to an embodiment of the present disclosure may be implemented.

The following will describe embodiments of the present disclosure in more detail with reference to the accompanying drawings. Although the drawings show certain embodiments of the present disclosure, it should be understood that the present disclosure can be implemented in various forms and should not be limited to the embodiments described herein. Instead, these embodiments are provided to enable a more thorough and complete understanding of the present disclosure. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

In a new protocol version of SMB, access permissions to files are implemented through leases. With a lease management mechanism, clients are allowed to adjust their buffering policies to improve performance and reduce network traffic. In addition, the access permissions implemented by the leases provide greater flexibility and better performance.

When a client file open request conflicts with an existing assigned access permission, a server may send an interrupt notification. When an exclusive access permission for a write operation is interrupted, the client needs to refresh data written to a cache to the server or close the file, and then the server can open the file to another client. When a shared access permission for a read operation is interrupted, the server will send a notification to the client that it has been interrupted, but will not wait for any acknowledgment since there is no cached data to be refreshed to the server.

If the server grants an access permission to a file open request that is less likely to conflict in a concurrent file sharing, the performance and cache consistency balance will be improved, and the access permission interrupt cost will be reduced in a system.

For the concurrent file sharing, if there is a high probability of future conflicting open/write requests when the access permission is granted, the performance loss may be severe and may become worse when a large number of files are configured on a network attached storage server.

In order to solve the above problem, considering that the conflict probability of open requests is closely related to an access mode in a product environment, some conventional access permission granting policies suggest to perform machine learning on each file and analyze the access mode of each file separately. Such an implementation is too burdensome for the system when a very large number of files are configured on the network attached storage server. On the one hand, a predefined or statically configured access permission granting policy does not work well in a dynamic environment. On the other hand, heavyweight algorithms are not suitable for analyzing the access mode of each file for each file implementation, especially when scalability challenges are considered.

In order to solve the above and other potential problems, an embodiment of the present disclosure provides a method for processing an access permission. In this method, a computing device receives an access request for a target file from a first client and then determines a type of an access permission contained in the request. The computing device next determines whether the type contained in the request is in a set of reference types, so as to determine a first type of an access permission which can be assigned to the first client. The computing device also determines a second type of an access permission applicable to be assigned to the target file. Then, the computing device determines from the first type and the second type a target type of an access permission to be assigned to the first client. Through this method, the probability of assigned access permissions being interrupted can be reduced, the performance of a client and a server is improved, and the efficiency and user experience are improved.

The embodiments of the present disclosure will be further described in detail with reference to the accompanying drawings below. FIG. 1 shows a schematic diagram of example environment 100 in which the embodiment of the present disclosure can be implemented.

As shown in FIG. 1, example environment 100 includes client 102 and computing device 106. Client 102 is configured to request an access management permission to target file 112 from computing device 106, and computing device 106 sends target type 114 of a grantable access permission to client 102, such as an exclusive access permission or a shared access permission.

Client 102 may be implemented as any type of computing device including, but not limited to, a mobile phone (e.g., a smart phone), a laptop computer, a portable digital assistant (PDA), an electronic book (e-book) reader, a portable game console, a portable media player, a game console, a set-top box (STB), a smart television (TV), a personal computer, a laptop computer, a vehicle-mounted computer (e.g., a navigation unit), and the like.

Client 102 is configured to generate access request 104 for obtaining an access permission of target file 112, such as an open request for obtaining an exclusive access permission to write target file 112, a shared access permission for reading, or free access permission. In some embodiments, request 104 includes an identifier of target file 112 and a type of an access permission to be obtained.

FIG. 1 shows that example environment 100 includes one client 102, which is an example only, rather than specifically limiting the present disclosure. Any number of clients may be included in example environment 100.

Computing device 106 is configured to manage target file 112 and may assign the access permission of target file 112 to client 102. After receiving access request 104 from client 102, computing device 106 first determines whether the access request is to obtain an exclusive type of access permission or a shared type of access permission. After it is determined that the two types of access permissions are to be obtained, access permission conflict check may be performed on the type of the access permission to be obtained in the access request. First type 108 of an access permission that can be granted to client 102 may be determined by the access permission conflict check.

In addition, computing device 106 obtains an access permission score for target file 112 based on a file identifier in the access request. The access permission score is periodically calculated in computing device 106 for determining the type of an access permission applicable to the file. For example, some files are often write-accessed by a plurality of clients and are therefore less suitable for assigning an exclusive access permission, while some files are not often write-accessed by a plurality of clients and are therefore suitable for assigning an exclusive access permission. Computing device 106 determines second type 110 of the access permission applicable to the file by the access permission score.

Computing device 102 then determines target type 114 of the access permission from first type 108 of the access permission and second type 110 of the access permission and sends the target type to client 102.

In some embodiments, the access permission for a file includes three types, an exclusive access permission, a shared access permission, or free, representing descending levels of access permission. In one example, the exclusive access permission may include two types of operations: One operation is read cache and write cache, and the other operation is read cache, write cache, and handle cache. The shared access permission also includes two types of operations: an operation of read cache and an operation of read cache and handle cache. The above examples are intended to describe the present disclosure only and are not specific limitations to the present disclosure. A person skilled in the art would be able to set an exclusive access permission and a shared access permission to include an operation type according to needs.

Computing device 106 includes, but is not limited to, a personal computer, a server computer, a handheld or laptop device, a mobile device (such as a mobile phone, a personal digital assistant (PDA), and a media player), a multiprocessor system, a consumer electronic product, a minicomputer, a mainframe computer, a distributed computing environment including any of the above systems or devices, and the like.

After client 102 obtains an access permission for the target type of the target file, client 102 may perform a corresponding write operation or read operation on the target file.

One target file 112 is shown in FIG. 1. The above is only an example, rather than a specific limitation to the present disclosure. Computing device 106 may manage any suitable number of files. In addition, while target file 112 is shown in FIG. 1 as being external to computing device 106, which is merely exemplary, target file 112 may also be stored within computing device 106.

Through this method, the probability of assigned access permissions being interrupted can be reduced, the performance of a client and a server is improved, and the efficiency and user experience are improved.

Figure 2:
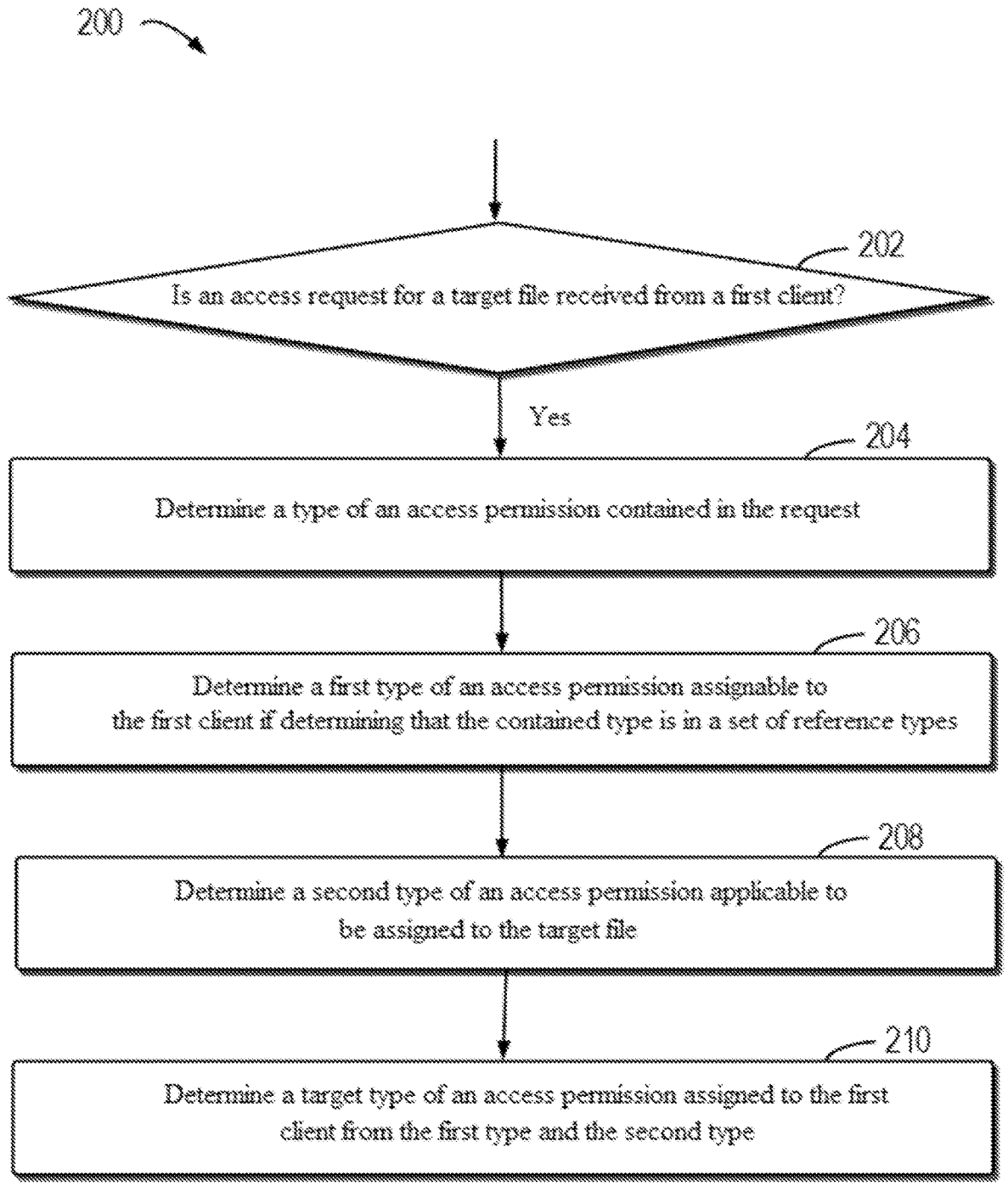
FIG. 2 illustrates a flow chart of method 200 for processing an access permission according to an embodiment of the present disclosure.

A block diagram of example system 100 in which embodiments of the present disclosure can be implemented has been described with reference to FIG. 1. A flow chart of method 200 for processing an access permission according to an embodiment of the present disclosure will be described below in combination with FIG. 2. Method 200 may be performed at computing device 106 in FIG. 1 and any suitable computing device.

At block 202, computing device 106 determines whether access request 104 for a target file is received from a first client. For example, computing device 106 may determine whether an open request for target file 112 is received from client 102.

If access request 104 is received, at block 204, computing device 106 determines a type of an access permission contained in the request. Typically, an access request will include a file identifier of a target file and a type of an access permission to be obtained by a user.

At block 206, computing device 106 determines a first type of an access permission which can be assigned to the first client if it is determined that the contained type is in a set of reference types. Upon receiving an access request, computing device 106 typically needs to determine whether a type of an access permission in the request is a shared type or an exclusive type. The exclusive type of the access permission refers to that the access permission for the file is granted to only one client. At this moment, the client may perform a write operation on the file, and when the file is written, the user may cache data locally and then send the data to a server under a certain condition, e.g., the amount of data reaches a threshold amount, or an interruption to the access permission occurs. The shared type of the access permission refers to that the access permission for the file may be granted to a plurality of users. At this moment, the users may read the file. If an access request of a user includes a type that does not require access permission, the user does not need to be granted with an access permission. Therefore, the determination process of a type of the access permission is not required. Further determination is needed for requesting an access permission of a shared type or an exclusive type. Therefore, the set of reference types includes a shared type and an exclusive type. In this way, an access permission of a shared type or an access permission of an exclusive type can be quickly determined.

In some embodiments, upon determining that the type of a permission in the access request is a shared type or an exclusive type, access permission conflict detection is required.

In some embodiments, if it is determined that no access permission of the target file has been assigned to a second client, the contained type is determined as the first type. For example, client 102 requests an exclusive access permission of target file 112 because no access permission of target file 112 has been assigned to other clients. Therefore, the exclusive access permission can be assigned to client 102. In this way, an assignable type of an access permission can be quickly determined.

In some embodiments, if it is determined that an access permission of the target file has been assigned to the second client, a type of the access permission that has been assigned needs to be determined. If the type contained in the access request does not conflict with the type that has been assigned, the contained type is determined as the first type. For example, if an access permission of a shared type is requested and access permissions assigned to other clients are also of a shared type, there will be no conflict, and the access permission of the shared type may be assigned to client 102. If it is determined that the contained type conflicts with the type that has been assigned, a shared type is determined as the first type. For example, if the type contained in the access request is an access permission of an exclusive type and an access permission of a shared type has been assigned to the target file, there is an access conflict, and thus the type of an access permission that can be assigned to client 102 is of a shared type. In this way, an assignable type of an access permission can be quickly determined. The above examples are intended to describe the present disclosure only and are not specific limitations to the present disclosure.

At block 208, computing device 106 determines a second type of an access permission applicable to be assigned to the target file. In addition, computing device 106 also needs to determine an applicable access permission for the file.

In some embodiments, computing device 106 obtains a file identifier for the target file included in the access request. Computing device 106 then looks up an access permission score corresponding to the target file from a local repository based on the file identifier. The access permission score is updated periodically after a predetermined time point or a predetermined time interval. In this way, an access permission score can be quickly determined.

In some embodiments, computing device 102 also obtains a plurality of type values corresponding to a plurality of types of the access permission after determining the access permission score for the target file, the plurality of types including the second type. For example, the plurality of types of the access permission include a shared type, an exclusive type, and free. Then, computing device 102 determines the second type from the plurality of types based on the access permission score and the plurality of type values.

For each type, there is a value corresponding to the type, e.g., the value corresponding to each type is obtained by, for example, calculating an average or a weighted sum of all access permission scores in the type. In this way, the type of access permissions available for the file can be quickly determined.

In some embodiments, computing device 106 may calculate a difference between the access permission score and the value corresponding to each type, and then determine that its corresponding type is the type of the applicable access permission for the target file based on the smallest value in absolute values of the difference.

In some embodiments, computing device 106 determines an access permission score for the target file. The computing device may then obtain a plurality of sets corresponding to a plurality of types of the access permission. Each set includes a group of access permission scores, and the plurality of types include the second type. Computing device 106 then matches the access permission score with access permission scores in the plurality of sets to determine the second type from the plurality of types. For example, the access permission score is compared with access permission scores in the set corresponding to each type, and if the access permission score exists in the set, it is indicated that the access permission score belongs to the type corresponding to the set. In this way, the type of access permissions available for the file can be quickly determined.

At block 210, computing device 106 determines from the first type and the second type a target type of an access permission to be assigned to the first client.

In some embodiments, when the determined first type of a grantable access permission is an exclusive access permission, an exclusive access permission or a shared access permission or a free access permission may be granted according to an access permission value. For example, when it is determined that the applicable access permission for the file is a shared access permission according to the access permission value at this moment, the shared access permission is determined as the target type. Similarly, when the first type of the grantable access permission is a shared access permission, it may be determined to grant the shared access permission or a free access permission according to the access permission value. In practical applications, when the first type of the grantable access permission is a shared access permission, the second type determined according to the access permission value is an exclusive access permission, and the target type is determined as a shared type at this moment.

In some embodiments, computing device 106 may periodically or periodically update the access permission score for a file managed by computing device 106. During update, computing device 106 may determine a plurality of recent requests for obtaining access permissions for the target file. The computing device then determines a plurality of usage durations of access permissions corresponding to the plurality of recent requests, first indication information indicating whether access permissions for the plurality of recent requests are interrupted, and second indication information indicating whether conflict occurs among access permissions for the plurality of recent requests. The computing device finally updates the access permission score based on the plurality of usage durations, the first indication information and the second indication information. In this way, an access permission score can be quickly and accurately updated. This process will be specifically described by the following example.

In the disclosure, computing device 106 would determine an access permission score for each file managed by the computing device. For files managed by computing device 106, if the number of files is N, there will be an access permission value $DQ=[dq_1, dq_2, dq_3, \ldots, dq_4, \ldots, dq_N]$ for N files in computing device 106, where $dq_n$ is an access permission score for file n and is initialized to 100, where n may be any one of 1 to N. To calculate DQ, some parameters are defined below:

$D_n$: Duration in minutes or seconds that an access permission is used in the last M open requests of file n, where $D_n=[d_1, d_2, d_3, \ldots, d_4, \ldots, d_M]$. For $i=1, \ldots, M$, $d_i$ represents the duration that an access permission is used in the ith open request. Since in some implementations, an exclusive access permission, such as an exclusive lease, may be downgraded to a shared access permission upon being interrupted, an example of interrupting an access permission is described below in connection with FIG. 4. Therefore, for $i=1, \ldots, M$, $d_i=de_i+w*ds_i$, where $de_i$ is the duration of an exclusive access permission for the ith open request and $ds_i$ is the duration of a shared access permission for the ith open request. Due to the lower cost of interrupting the shared access permission, $ds_i$ will obtain an adjustment coefficient w, which may be, for example, set to 1 or any suitable value. $d_i$, $de_i$, and $ds_i$ are evaluated from 0 to 100. If the duration exceeds 100 minutes, $d_i$, $de_i$, and $ds_i$ are marked as 100, because 100 minutes may be regarded as a good access permission grant result, and if no access permission is granted in the open request, $d_i$, $de_i$, and $ds_i$ are 0.

$R_n$: Indication information of whether an access permission is interrupted in the last M open requests of file n, where $R=[r_1, r_2, r_3, \ldots, r_4, \ldots, r_M]$. For $i=1, \ldots, M$, $r_i=[re_i, rs_i]$, where $r_i$ represents whether an access permission is interrupted for the ith open request, $re_i$ represents whether an exclusive access permission is interrupted for the ith open request, and $rs_i$ represents whether a shared access permission is interrupted for the ith open request.

If the exclusive access permission for the ith open request is not interrupted, $re_i$ is 1, and if the exclusive access permission for the ith open request is interrupted, $re_i$ is $-1$; otherwise, if the exclusive access permission is not granted for the ith open request, $re_i$ is 0.

If the shared access permission for the ith open request is not interrupted, $rs_i$ is 1; if the shared access permission for the ith open request is interrupted, $rs_i$ is $-1$; and if the shared access permission is not granted for the ith open request, $rs_i$ is 0.

$C_n$: Indication information of whether access permission conflict occurs in the last M open requests of file n, where $C=[c_1, c_2, c_3, \ldots, c_4, \ldots, c_M]$. For $i=1, \ldots, M$, $c_i$ represents whether access permission conflict occurs to the ith open request. For the ith open request, no access permission conflict occurs during file opening, then $c_i$ is 0, otherwise $c_i$ is 1.

When an access permission decision is made by the computing device upon receiving a new open request for file n, data of the current access request for the target file is saved using element $[d_M, r_M, c_M]$. Element $[d_M, r_M, c_M]$ is initialized. $[d_M, r_M, c_M]=[de_M+w*ds_M, [re_M, rs_M], c_M]=[0+w*0, [0, 0], 0]$, and it is added to $D_n$, $R_n$, $C_n$ as the Mth element based on the first-in-first-out principle. The Mth element of $D_n$, $R_n$, $C_n$ will be updated in the following cases:

1) if the result of an open request is "no access permission granted," rM is updated to [0, 0];
2) if no exclusive access permission of file n is interrupted during the grant of the exclusive access permission, reM is updated to 1;
3) if the exclusive access permission is interrupted on file n, reM is updated to −1;
4) if no shared access permission of file n is interrupted during the grant of the shared access permission, rsM is updated to 1;
5) if the shared access permission is interrupted on file n, rsM is updated to −1;
6) if access permission conflict occurs on file n, cM is updated to 1;
7) when the exclusive access permission of file n ends or is interrupted, deM is updated to the duration of the exclusive access permission;
8) when the shared access permission of file n ends or is interrupted, dsM is updated to the duration of the shared lease.

The computing device may then update dqn after a predetermined time or a predetermined time interval using equations (1) and (2) below.

$$\overline{dq_n} = dq_n \times \frac{\sum_{m=1}^{M} \omega_m d'_m}{\sum_{m=1}^{M} \omega_m d_m} \quad (1)$$

$$dq_n = \min(\overline{dq_n}, 100) \quad (2)$$

where $\omega_m$ is a weight of the $m^{th}$ open request for file n received by the computing device, which may be set to any suitable value based on needs, and may be generally set to 1; and min ( ) represents adoption of the minimum data. $d'_m$ in the above equation (1) may be determined by the following process.

For file n, $D'_n$ corresponding to D. is introduced. For the recent M open requests of file n, $D'_n=[d'_1, d'_2, d'_3, \ldots, d'_4, \ldots, d'_M][d'_{e1}+w*d'_{s1}, d'_{e2}+w*d'_{s2}, \ldots, d'_{eM}+w*d'_{sM}]$. For m=1, ..., M, $d'_{em}$ and $d'_{sm}$ are initialized to $d_{em}$ and $d_{sm}$; $d'_m$ is in the range [0-100] and may be determined based on the following pseudo-code:

```
for each m in range(1,M):
    if (r_m=[0,0] and c_m=0) {
        d'_em=50;
``` indicating that $d'_m$ is updated to a positive value after the computing device determines that no access permission is granted and no access permission conflict occurs, which means that granting access permissions is actually worthwhile and will help to increase an "access permission score" for file n;

```
}
else {
    if (r_em=−1) {
        if (d_em>50) {
            d'_em=min(100, d_em+20);
``` where if the duration is long, the exclusive access permission is of high quality even if the exclusive access permission is interrupted

```
        }
        else{
            d'_em=max(0, d_em−20)
``` reducing its value in the case of an interruption helps to reduce an access permission value of file n;
the same operation is performed when the shared access permission is interrupted

```
If (r_sm=−1) {
``` duration limits for a high-quality shared access permission are relaxed compared to a high-quality exclusive access permission

```
If (d_sm>10) {
    d'_sm=min (100, d_sm+20);
}
else{
    d'_sm=max (0, d_sm−20);
}
}
d'_m = d'_em + w*d'_sm;
```

In the above description, max( ) represents adoption of a maximum value therein, and min( ) represents adoption of a minimum value therein.

In some embodiments, an applicable lease type may be determined for each file for DQs of N files after obtaining the access permission score for each file. In one example, a clustering operation is performed on a plurality of access permission scores for a plurality of files including the target file for classification. The plurality of access permission scores include the updated access permission score. In another example, the access permission score for a file may be compared with several predetermined thresholds to determine an applicable type for the access permission. For example, for an access permission of a free type, the corresponding threshold is 0; for an access permission of a shared type, the corresponding threshold is 50; and for an access permission of an exclusive type, the corresponding threshold is 90. Therefore, if the access permission score for a file is greater than 0 and less than 50, it is a free type; if the access permission score is greater than 50 and less than 90, it is a shared type; and if the access permission score is greater than 90, it is an exclusive type. In one example, each type corresponds to a mean value, and the type of the access permission score for a file is determined based on the closest mean value relative to the access permission score for a file. The above examples are intended to describe the disclosure only and are not specific limitations to the present disclosure.

In some embodiments, the mean value corresponding to each type and the access permission score included in the set for each type may be determined by a clustering algorithm. Both the mean and the set may be configured to determine the type of the access permission of the file. A k-means clustering algorithm implementation process will be described below.

For each file n, one of three possible results is output as an access permission type based on value $dq_n$: exclusive access permission or shared access permission or free access permission.

The inputs in this algorithm are: data set data_in ={$dq_1$, $dq_2$, ..., $dq_N$}, number of clusters K=3, and maximum number of iterations ε=100.

The computing process is as follows:
1) The initialization corresponds to the mean value of each cluster, and since the maximum score is 100, the mean value corresponding to three clusters is {$\mu_1,\mu_2,\mu_3$}={0,50,100}.
2) For k∈{1,2,3} a set in each cluster corresponds to $C_k$=Ø, and each set does not include data elements at this moment.
3) For i=1, 2, ..., N, N is the number of files in the computing device
   a) The distance {$d_{i,k}=\|dq_i-\mu_k\|_2$}$|_{k=1}^K$ between the access permission score for each file and the mean value of each cluster is calculated.
   b) For $dq_i$, corresponding cluster identifiers: $\lambda_i$=arg min$_{k\in\{1,2,3\}}d_{i,k}$, $C_{\lambda_i}=C_{\lambda_i}\cup\{dq_i\}$ are determined, where min( ) is the minimum value among three values, arg( ) is used to take the value of subscript k of the minimum value among the three values, and then, $dq_i$ is incorporated into the set of clusters $C_{\lambda_i}$ corresponding to $\lambda_i$.
4) For k=1, 2, ..., K, the following operation is performed:
   c) The mean value of the clusters is updated:

$$\mu'_k = \frac{1}{|C_k|}\sum_{dq\in C_k} dq,$$

where |$C_k$| represents the number of elements in set $C_k$.
   d) If $\mu'_k \neq \mu_k$, $\mu_k=\mu'_k$ is updated.
   e) Otherwise, the operation is continued.
5) The mean value obtained by repeating the above steps 2) to 4) does not reach the number of updates or repetitions ε. Finally, the mean value {$\mu_1, \mu_2, \mu_3$} corresponding to three types and the set of three types C={$C_1, C_2, C_3$} are output.

For the three candidate types: exclusive access permission or shared access permission or free access permission, the cluster with the maximum mean value corresponds to the exclusive access permission, and the cluster with the minimum mean value corresponds to the free access permission. An access permission of a correct type is queried for file n, and a cluster identifier of file n is determined by computing arg min$_{k\in\{1,2,3\}}$(dist$_{ed}$ ($dq_n,\mu_k$)$|_{k=1}^K$) according to its current $dq_n$, where dist$_{dq}$( ) refers to determining an absolute value of a distance or difference between two values therein, and arg( ) is used to take the value of subscript k of the minimum value among three values.

Through this method, the probability of assigned access permissions being interrupted can be reduced, the performance of a client and a server is improved, and the efficiency and user experience are improved.

Figure 3:
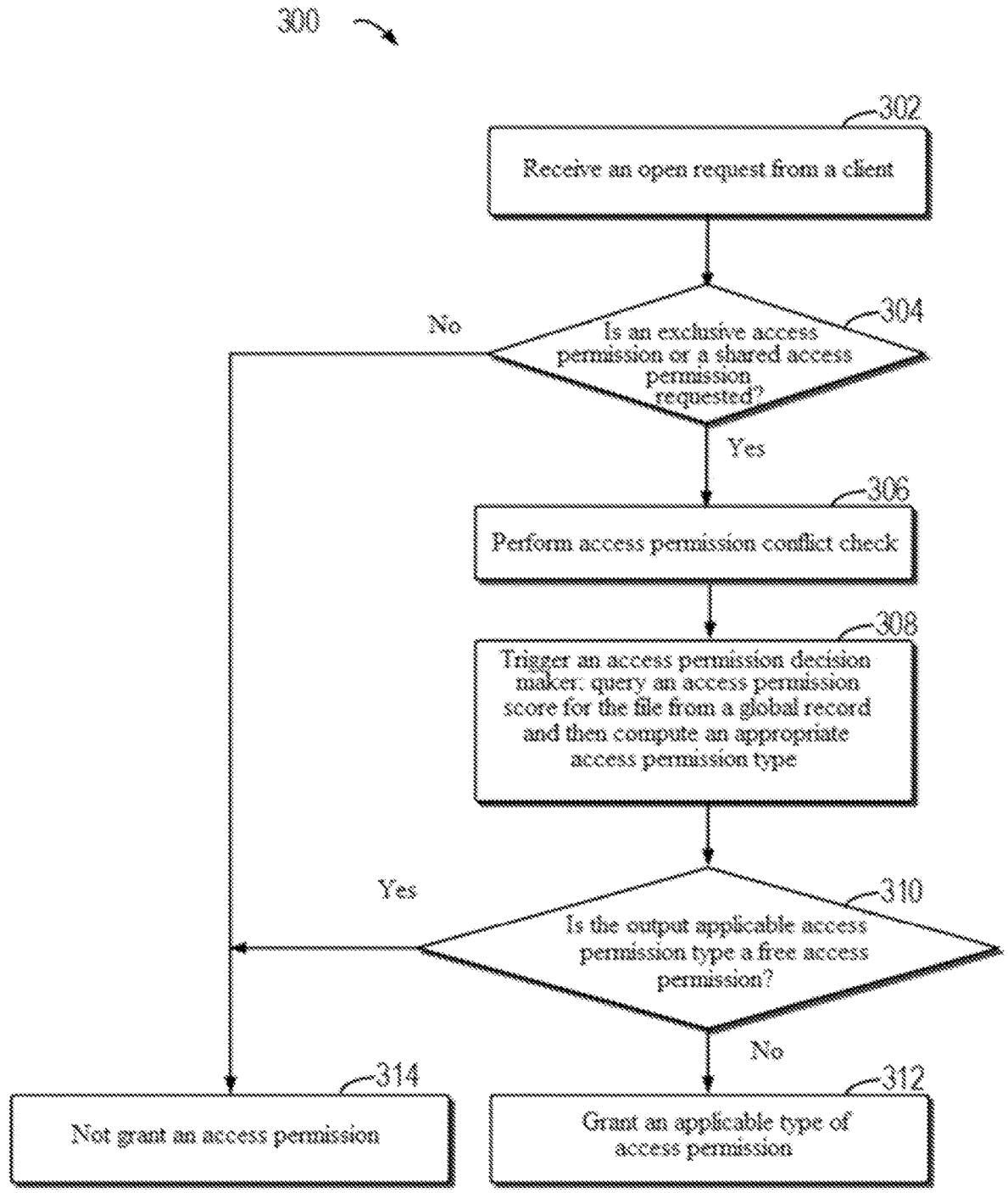
FIG. 3 illustrates a schematic diagram of example method 300 for processing an access permission according to an embodiment of the present disclosure.

A flow chart of method 200 for processing an access permission according to an embodiment of the present disclosure has been described above in combination with FIG. 2. A flow chart of method 300 for processing an access permission according to an embodiment of the present disclosure will be described below in combination with FIG. 3. Method 300 may be performed at computing device 106 in FIG. 1 or any suitable computing device.

At block 302, a computing device receives an open request from a client. It is then determined at block 304 whether an exclusive access permission or a shared access permission is requested. If neither, it is indicated that no access permission is requested, and no access permission is granted at block 314. If an exclusive access permission or a shared access permission is requested, access permission conflict check is performed at block 306. When conflict check is performed, if no other client accesses the file, an access permission which can be assigned is the exclusive access permission or the shared access permission. If the open request causes a conflict, an access permission which can be assigned is the shared access permission. At block 308, an access permission decision maker is triggered: An access permission score for the file is queried from a global record, and an applicable access permission type is calculated. For example, the type is determined based on the access permission score being closest to the mean value of which type of access permission. It is then determined at block 310 whether the output applicable access permission type is a free access permission. If yes, block 314 is entered, and if no, an applicable type of access permission is granted at block 312.

Through this method, the probability of assigned access permissions being interrupted can be reduced, the performance of a client and a server is improved, and the efficiency and user experience are improved.

A flow chart of method 300 for processing an access permission according to an embodiment of the present disclosure has been described above in combination with FIG. 3. Example processes 400A and 400B for interrupting an access permission according to an embodiment of the present disclosure are described below in conjunction with FIGS. 4A and 4B. Processes 400A and 400B may be performed at computing device 106 in FIG. 1 or any suitable computing device.

Figure 4A:
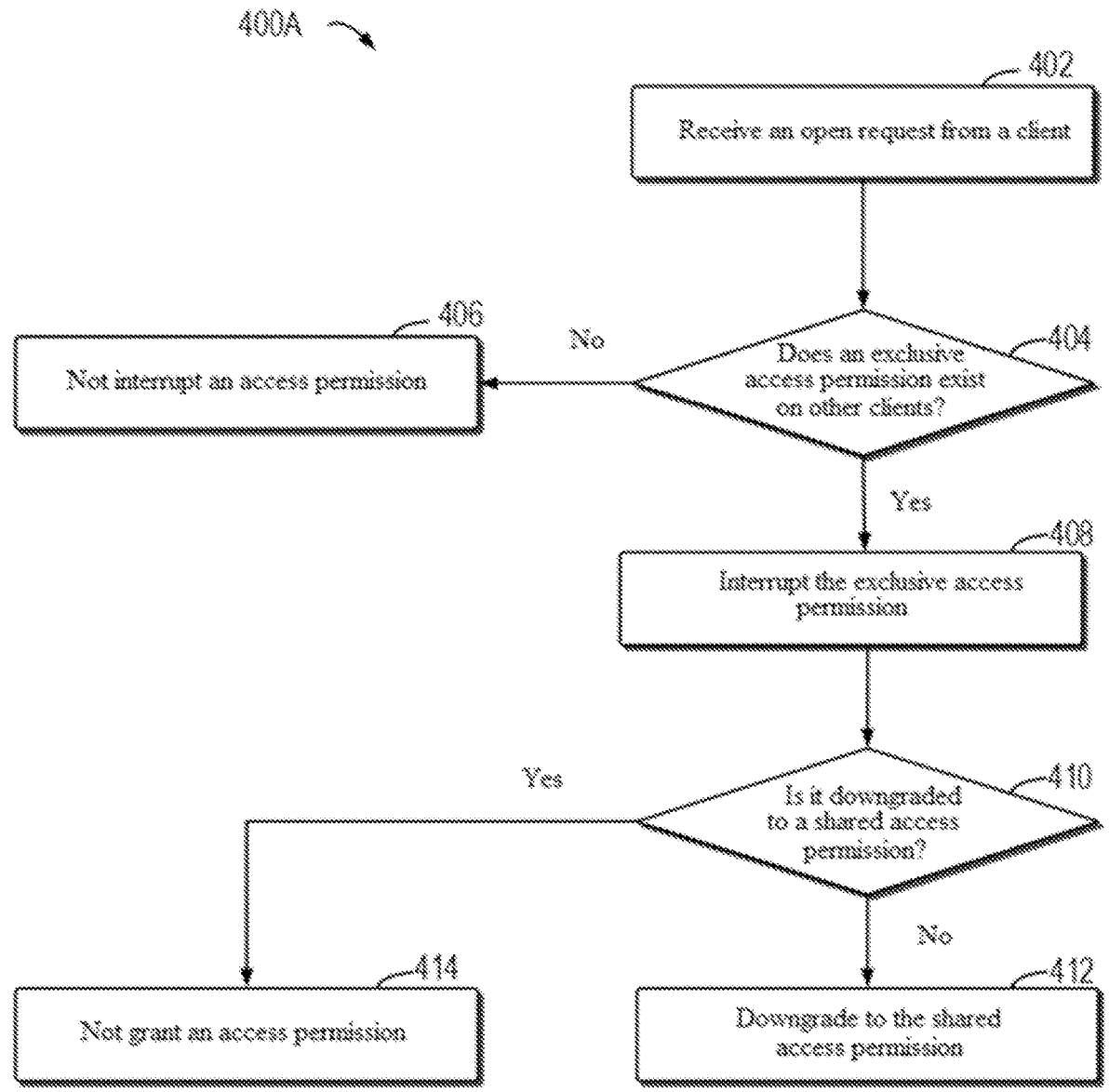
FIG. 4A illustrates a schematic diagram of example process 400A for interrupting an access permission according to an embodiment of the present disclosure.

As shown in FIG. 4A, an open request is received from a client at block 402, it is determined at block 404 whether an exclusive access permission exists on other clients, and if no, no access permission is interrupted at block 406. If yes, an exclusive access permission is interrupted at block 408. It is then determined at block 410 whether to downgrade to a shared access permission. If yes, it is downgraded to the shared access permission at block 414. If no, no access permissions are granted to other clients at 412.

Figure 4B:
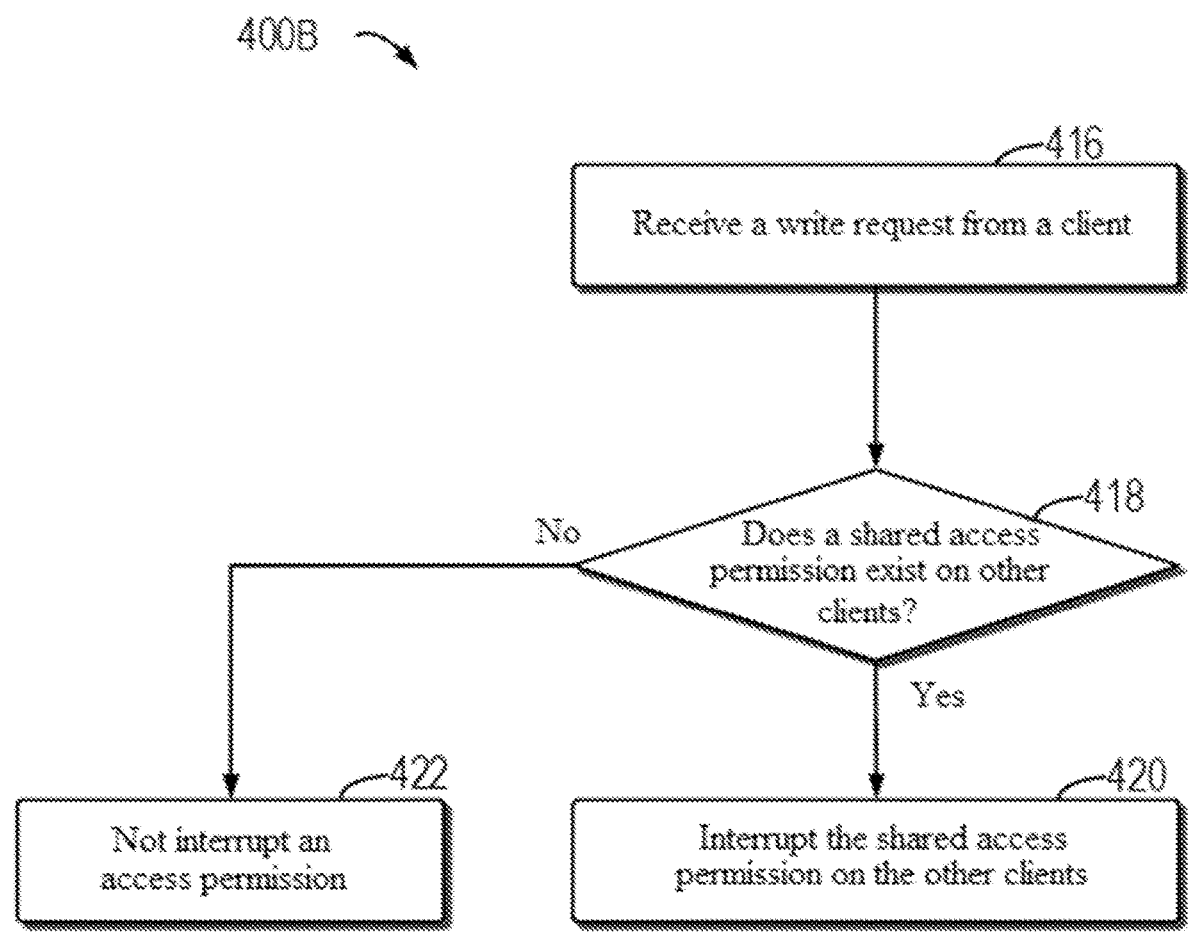
FIG. 4B illustrates a schematic diagram of example process 400B for interrupting an access permission according to an embodiment of the present disclosure.

As shown in FIG. 4B, a write request is received from a client at block 416, it is determined at block 418 whether a shared access permission exists on other clients, and if no, no access permission is interrupted at block 422. If yes, the shared access permissions of other clients are interrupted at block 420.

By this method, it can be quickly determined whether an access permission is to be interrupted.

Figure 5:
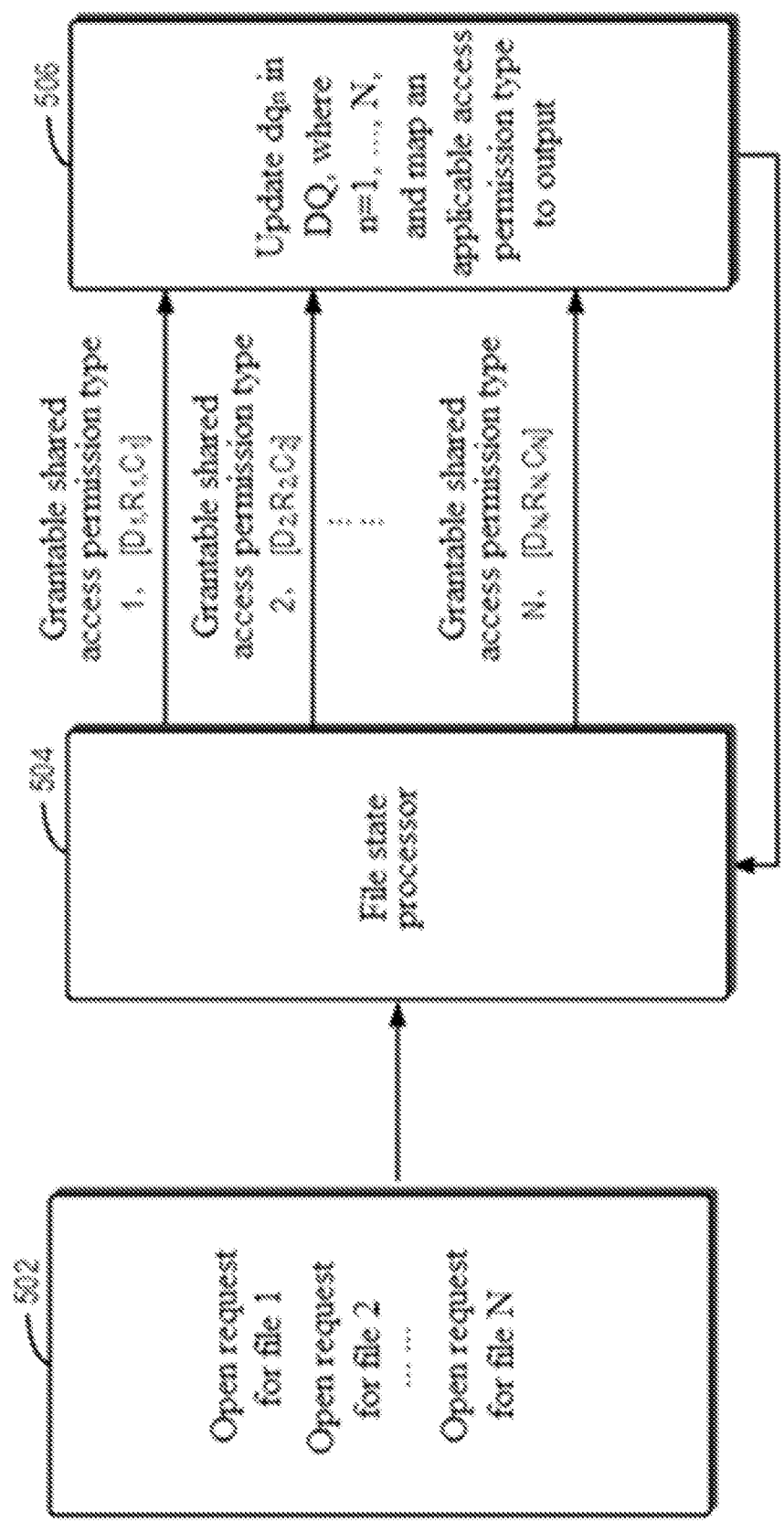
FIG. 5 illustrates a schematic diagram of example 500 for processing an access request according to an embodiment of the present disclosure.

Example processes 400A and 400B for interrupting an access permission have been described above in conjunction with FIGS. 4A and 4B. A schematic diagram of process 500 for processing an access request according to an embodiment of the present disclosure will be described below in combination with FIG. 5. Process 500 may be performed at computing device 106 in FIG. 1 or any suitable computing device.

At block 502, an open request for N files is received and then processed by a file state processor at 504, and grantable access permission types for each file and corresponding Di, Ri, and Ci values are determined. $dq_n$ in DQ is then updated at block 506, n=1, ..., N, and an applicable access permission type for the file is output to the file state processor to finally determine a target type of an access permission to be assigned.

Through this method, the probability of assigned access permissions being interrupted can be reduced, the performance of a client and a server is improved, and the efficiency and user experience are improved.

Figure 6:
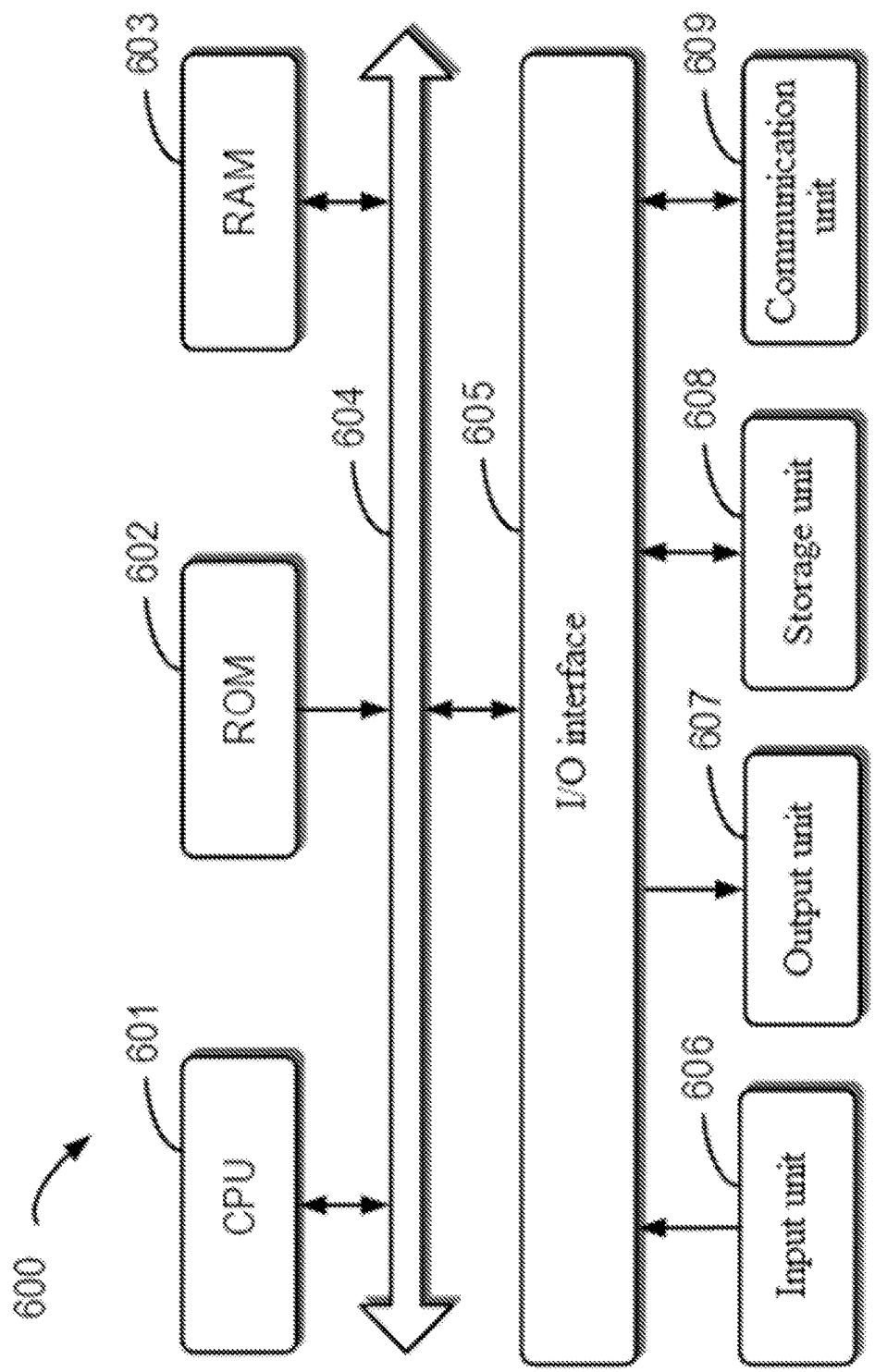
FIG. 6 illustrates a schematic block diagram of example device 600 applicable to implement an embodiment of the content of the present disclosure.

FIG. 6 shows a schematic block diagram of example device 600 that may be used to implement an embodiment of the present disclosure. Computing device 106 in FIG. 1 may be implemented using device 600. As shown in the figure, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage page 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, for example, methods 200, 300, 400A, 400B, and 500, may be executed by processing unit 601. For example, in some embodiments, methods 200, 300, 400A, 400B, and 500 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded into RAM 603 and executed by CPU 601, one or more actions of methods 200, 300, 400A, 400B, and 500 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus, the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

What is claimed is:

1. A method, comprising:
   in response to receiving an access request for a target file from a first client, determining, by a system comprising at least one processor, a type of access permission contained in the access request;
   in response to determining that the type of access permission is in a set of reference types, determining a first type of access permission that is able to be assigned to the first client;
   determining a second type of access permission applicable to be assigned to the target file, wherein determining the second type comprises:
      determining an access permission score for the target file;
      obtaining sets corresponding to types of the access permission, each set of the sets comprising a respective group of access permission scores, and the types comprising the second type; and
      matching the access permission score with access permission scores in the sets to determine the second type from the types; and
   determining, from the first type and the second type, a target type of access permission to be assigned to the first client.

2. The method according to claim 1, wherein determining the first type comprises:
   in response to determining that no access permission of the target file has been assigned to a second client, determining the first type as the type of access permission contained in the access request.

3. The method according to claim 2, wherein determining the first type further comprises:
   in response to determining that an access permission of the target file has been assigned to the second client, determining an assigned type of the access permission that has been assigned to the second client;
   in response to determining that the type of access permission contained in the access request does not conflict with the assigned type that has been assigned, determining the first type as the type of access permission contained in the access request; and
   in response to determining that the type of access permission contained in the access request conflicts with the assigned type that has been assigned, determining the first type as a shared type.

4. The method according to claim 1, wherein the set of reference types comprises a shared type and an exclusive type.

5. The method according to claim 1, wherein determining the access permission score comprises:
   obtaining a file identifier for the target file comprised in the access request; and
   obtaining the access permission score corresponding to the target file based on the file identifier.

6. The method according to claim 1, further comprising:
   determining recent requests for obtaining access permissions for the target file;
   determining usage durations of the access permissions corresponding to the recent requests, first indication information indicating whether the access permissions for the recent requests are interrupted, and second indication information indicating whether conflict has occurred among the access permissions for the recent requests; and
   updating the access permission score based on the usage durations, the first indication information, and the second indication information, the updating resulting in an updated access permission score.

7. The method according to claim 6, further comprising:
   performing a clustering operation on access permission scores for files comprising the target file for classification, wherein the access permission scores comprise the updated access permission score.

8. A device, comprising:
   at least one processor; and
   a memory coupled to the at least one processor and having instructions stored thereon, wherein the instructions, when executed by the at least one processor, cause the device to perform actions comprising:
      determining, in response to receiving an access request for a target file from a first client, a contained type of an access permission contained in the access request;

based on determining that the contained type is in a set of reference types determining a first type of access permission that is assignable to the first client;

determining a second type of access permission applicable to be assigned to the target file, wherein determining the second type comprises:

determining an access permission score for the target file;

obtaining a group of sets corresponding to a group of types of the access permission, each set comprising a group of access permission scores, and the group of types comprising the second type; and matching the access permission score with access permission scores in the group of sets to determine the second type from the group of types; and determining, from the first type and the second type, a target type of access permission to be assigned to the first client.

9. The device according to claim 8, wherein determining the first type comprises:

based on determining that no access permission of the target file has been assigned to a second client, determining the first type as the contained type.

10. The device according to claim 9, wherein determining the first type further comprises:

based on determining that an access permission of the target file has been assigned to the second client, determining an assigned type of the access permission that has been assigned to the second client;

based on determining that the contained type does not conflict with the assigned type that has been assigned, determining the first type as the contained type; and based on determining that the contained type conflicts with the assigned type that has been assigned, determining the first type as a shared type.

11. The device according to claim 8, wherein the set of reference types comprises a shared type and an exclusive type.

12. The device according to claim 8, wherein determining the access permission score comprises:

obtaining a file identifier for the target file comprised in the access request; and obtaining the access permission score corresponding to the target file based on the file identifier.

13. The device according to claim 8, wherein the actions further comprise:

determining a group of recent requests for obtaining access permissions for the target file;

determining a group of usage durations of the access permissions corresponding to the group of recent requests, first indication information indicating whether the access permissions for the group of recent requests are interrupted, and second indication information indicating whether conflict occurs among the access permissions for the group of recent requests; and updating the access permission score based on the group of usage durations, the first indication information, and the second indication information, the updating resulting in an updated access permission score.

14. The device according to claim 13, wherein the actions further comprise:

performing a clustering operation on a group of access permission scores for a group of files comprising the target file for classification, wherein the group of access permission scores comprise the updated access permission score.

15. A computer program product stored on a non-transitory computer-readable medium and comprising machine-executable instructions that, when executed, cause a machine to perform operations, comprising:

in response to receiving an access request for a target file from a first client, determining a contained type of access permission contained in the access request;

in response to determining that the contained type of access permission is in a set of reference types, determining a first type of access permission that is able to be assigned to the first client;

determining a second type of access permission to be assigned to the target file, the second type being different than the first type, wherein determining the second type comprises:

determining an access permission score for the target file;

obtaining sets corresponding to types of the access permission, each set of the sets comprising a respective group of access permission scores, and the types comprising the second type; and matching the access permission score with access permission scores in the sets to determine the second type from the types; and determining, from the first type and the second type, a target type of access permission to be assigned to the first client.

16. The computer program product according to claim 15, wherein determining the first type comprises:

in response to determining that no access permission of the target file has been assigned to a second client different than the first client, determining the first type as the contained type.

17. The computer program product according to claim 16, wherein determining the first type further comprises:

in response to determining that an access permission of the target file has been assigned to the second client, determining an assigned type of the access permission that has been assigned to the second client;

in response to determining that the contained type does not conflict with the assigned type that has been assigned, determining the first type as the contained type; and in response to determining that the contained type conflicts with the assigned type that has been assigned, determining the first type as a shared type.

18. The computer program product according to claim 15, wherein the set of reference types comprises a shared type and an exclusive type.

19. The computer program product according to claim 15, wherein determining the access permission score comprises:

obtaining a file identifier for the target file comprised in the access request; and obtaining the access permission score corresponding to the target file based on the file identifier.

20. The computer program product according to claim 15, wherein the operations further comprise:

determining recent requests for obtaining access permissions for the target file;

determining usage durations of the access permissions corresponding to the recent requests, first indication information indicating whether the access permissions for the recent requests are interrupted, and second indication information indicating whether conflict has occurred among the access permissions for the recent requests; and updating the access permission score based on the usage durations, the first indication information, and the second indication information, the updating resulting in an updated access permission score.

* * * * *